May 12, 1970 H. MARGULIUS 3,511,978

PARALLEL BINARY MAGNETIC ADDITION SYSTEM BY COUNTING

Original Filed Oct. 22, 1965 2 Sheets-Sheet 1

INVENTOR.
HARRY MARGULIUS

BY

CHARLES S. MCGUIRE
ATTORNEY

PARALLEL BINARY MAGNETIC ADDITION SYSTEM BY COUNTING

Original Filed Oct. 22, 1965

INVENTOR.
HARRY MARGULIUS
BY
CHARLES S. MCGUIRE
ATTORNEY 3,511,978
Patented May 12, 1970

3,511,978

PARALLEL BINARY MAGNETIC ADDITION SYSTEM BY COUNTING

Harry Margulius, 5 Nottingham St., Newton, Mass. 02159

Continuation of application Ser. No. 500,787, Oct. 22, 1965. This application Oct. 24, 1968, Ser. No. 770,907
Int. Cl. G06f 7/385
U.S. Cl. 235—175 9 Claims

ABSTRACT OF THE DISCLOSURE

A full adder is disclosed which is based on magnetic-core-transistor logic. A novel accumulator is shown which comprises a chain of core-transistor binary counting elements to each of which are added additional inputs. The adder in its preferred embodiment comprises four registers with an element of core-transistor logic for each bit. The binary digits of $\overline{A}$ (the inverse of the addend A) appear in a storage register 10; and the binary digits of the augend B appear in a buffer transfer register 18. As a first step of the parallel adding process, corresponding bit position elements of the four registers accommodate the two inputs and the two outputs of an "exclusive or" binary half-adder. The inverted partial sum $\overline{S}$ output enters the counter register 16, the carry enters the carry register 14. A unity input to each element of the counter is implemented simultaneously with the input of the inverted partial sum $\overline{S}$ so that the latter is inverted to S. At a second step, the carrys are shifted out as two outputs spaced in time one from the other. A non-delayed first output serves as a shift pulse to the counter module for the next digit order forward, as does a similar, nondelayed output from the corresponding lower-order counter module. Delayed outputs from corresponding order carry storage and counter modules are connected in like manner to form a single logic input to the next-higher-order counter module. In this manner carrys are applied simultaneously to the successive orders of partial sums and any additional carrys generated in the addition of a carry and a partial sum digit are propagated through the counter to reflect the final sum when all carrys have settled out.

This is a continuation of application Serial No. 500,787 filed Oct. 22, 1965, now abandoned.

This invention relates to digital computers, and more specifically to a novel arrangement of computer elements wherein arithmetic operations are performed on numbers whose digits are applied to the computer simultaneously, i.e., in parallel manner.

The basic arithmetic element in virtually all high-speed digital computers is essentially a unit capable of performing additions in response to given input signals. A computer made up of such elements may be easily adapted to perform other elementary arithmetic operations, such as subtraction, multiplication, etc., since these operations may all be reduced, directly or indirectly, to addition. The input and output information may be of the yes-no type when a binary numerical system is used. For example, the information may be in the form of electrical signals, the presence of a signal at a particular location in the computer indicating one number and the absence of a signal indicating the other. An electrical signal in the form of a current flowing through a conductor may be further utilized to induce a magnetic state in a suitable flux path, whereby the magnetized condition may represent one number and the non-magnetized condition the other; alternatively, the two numbers may be represented by the direction of the magnetic field. Thus, any given number having $n$ digits may be registered by a plurality of coherent signals arranged in consecutive order so that each digit is represented by a signal (or the absence of same) at locations in the computer corresponding to each digit order of the number. The operations necessary to produce the sum or other desired output information from the inputs are performed by logic circuits which may be formed in a virtually infinite number of previously known ways from components such as tubes, transistors, diodes and even purely mechanical members.

As will appear more fully hereinafter, the operations may be performed in either a synchronous manner, i.e., with operations performed in recurring time periods of fixed duration, or in an asynchronous or variable time manner, with each operation being begun in response to completion of the previous operation.

When considering the case of a simple addition of two numbers to be performed by a computer, each digit of the sum results from the addition of the digits in each corresponding digit order of the two numbers and the carry, if any, resulting from the addition of the digits in the preceding digit order. In a basic parallel adding device, signals representing the digits of the two numbers to be added are supplied simultaneously to an appropriate gate circuit at each digit order. The gates are adapted to pass to a storage register, or the like, signals representing the partial sum of the two numbers; that is, a number whose digits correspond, at each digit order, to the sum of the digits in the like digit order of the two numbers being added, without regard to the carrys. Signals representing the carrys may be passed from the gate circuits to a separate storage register, or may be handled in some other way. In arriving at the final sum the carrys must be added to the partial sum, which is conventionally done by "rippling" the carrys, one at a time, through the partial sum or, more properly, by applying a signal from the least significant digit order at which a carry was generated in the initial addition to the partial sum storage register element in the next most significant digit order; if a new carry is generated from the addition of a previous carry and a digit in the partial sum, the new carry is then added to the partial sum in the next digit order forward, and so on. Each of the carrys generated in the addition of the digits of the two numbers to be added must be rippled through the partial sum in like fashion to arrive at the final sum.

Although some schemes have been devised for speeding up this process, such as rippling some carrys through simultaneously in separate stages of the storage register to eliminate rippling every carry completely through the register, the addition of the carrys to the partial sum is still by far the most time consuming part of the process. The present invention, as will appear more fully from the following detailed description, provides a computer capable of performing arithmetic operations in parallel fashion without the necessity of rippling the carrys through an intermediate result in any previously known fashion. By providing at each digit order in the counter or accumulator (as hereinafter defined) a unit or element capable of acting as both a gate and a storage member (i.e., having both memory and logic capability), all carrys may be applied simultaneously to the accumulator, wherein the partial sum is already stored, and the final sum will appear by generation and propagation of carrys through the accumulator until all have "settled out." That is, rather than applying signals representing carry values to the partial sum singly, or in stages, by the conventional means of applying successive clock pulses, spaced in time, the present invention applies all carrys by a single clock pulse to the partial sum, thereby arriving at the final sum in only the time required for the counter elements wherein the digits are registered to change accordingly from the partial to the final sum.

Computer operation in the above-described manner obviously results in vast time savings over previous means of carrying out arithmetic operations in similar devices. Furthermore, logic operations of comparable complexity may be performed with circuitry which is less complicated and expensive, in general, and much more reliable than in previously known computer apparatus of comparable speed. The time saving features realized by the computer operation of the present invention, according to a preferred embodiment, makes use of storage elements of the magnetic type without objectionable time loss. Although magntic elements have the advantages of superior reliability of operation, low power requirements and high radiation resistance, they have been unsatisfactory for many uses since many other storage elements, such as bistable semiconductor circuits, have the ability to vary between the states representing different digits much more rapidly.

Certain objects and advantages of the invention are obvious from the foregoing general description, and others will appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
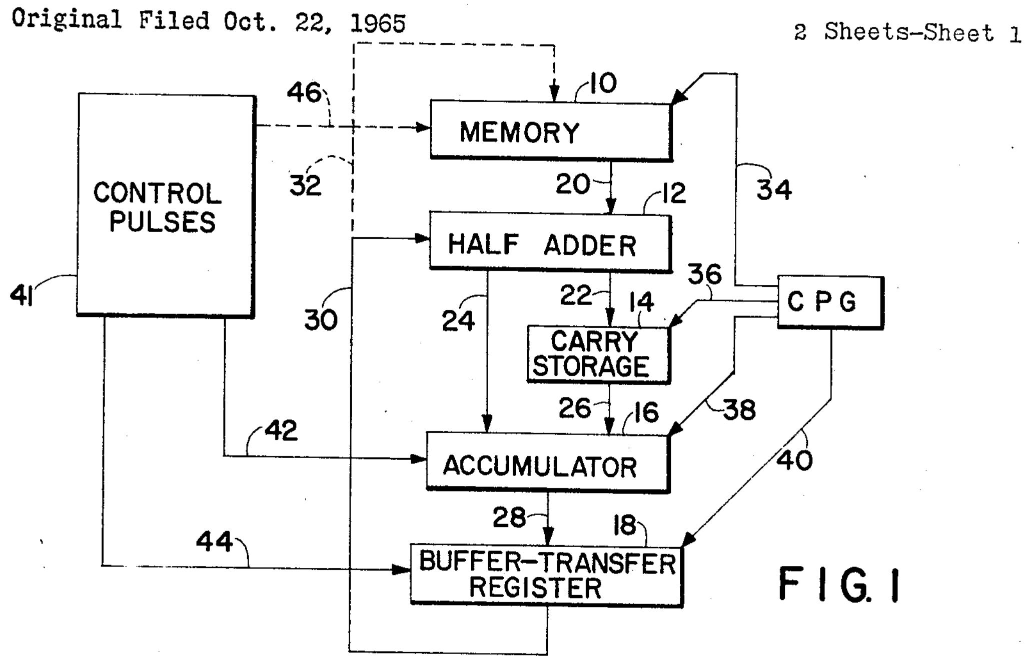
FIG. 1 is a block diagram showing the general flow of information through the several stages of the computer.

Referring now to the drawings, the block diagram of FIG. 1 shows the various stages of the unit of the invention, for purposes of general illustration, as individual blocks although it will be readily understood that each stage includes a plurality of elements corresponding to each bit of the words upon which logic operations are to be performed. Throughout the following description it will be assumed that the information in any given stage of the apparatus is in the form of binary words (numbers) up to *n* bits (digits) in length. The memory block 10 represents generally a storage register or memory unit of any convenient, previously known design capable of receiving in a plurality of cells a given type of input representing a binary word, storing the word by assuming and retaining in each cell a condition corresponding to the successive bits of the word, and producing an output from each cell representing the word in response to the application of a given impulse. According to the usual computer terminology, the memory and arithmetic element or unit of a computer are considered two separate, major subsections thereof. It will be understood, therefore, that memory 10 is illustrated merely to show the source of input to the arithmetic unit and actually does not form one of the stages thereof. The output is generated for the purpose of transferring the word to and/or through another stage of the unit, and conventionally takes place in response to the application of a clock pulse to the various elements of the storage register. The block labeled CPG represents a conventional clock pulse generator connected in known fashion to register 10 for the purpose of shifting out information stored therein.

The half adder block 12 represents a stage of half adder means which comprises, for purposes of the present invention, means for generating two output signals which represent given logic functions of two inputs which are simultaneously applied to the half adder. For example, two inputs representing binary numbers may be applied to the half adder and one output therefrom may comprise the partial sum of the two numbers and the other output, the carrys. Although half adders capable of performing such functions have been well known in a number of forms for some time, a preferred embodiment is described below in more detail. One output signal (or group of signals) from half adder 12 is applied as an input to a storage register block 14. The other output from half adder 12 is applied to the accumulator block 16 termed the counter or accumulator since, according to the preferred embodiment, it is adapted to record the final result of an arithmetic operation and also to feed this result (through additional elements) back to half adder 12 for further combination with new numbers supplied thereto from register 10 for subsequent arithmetic operations. Furthermore, accumulator 16 is adapted to perform logic functions in arriving at the final sum, as explained more fully hereinafter.

Figure 3:
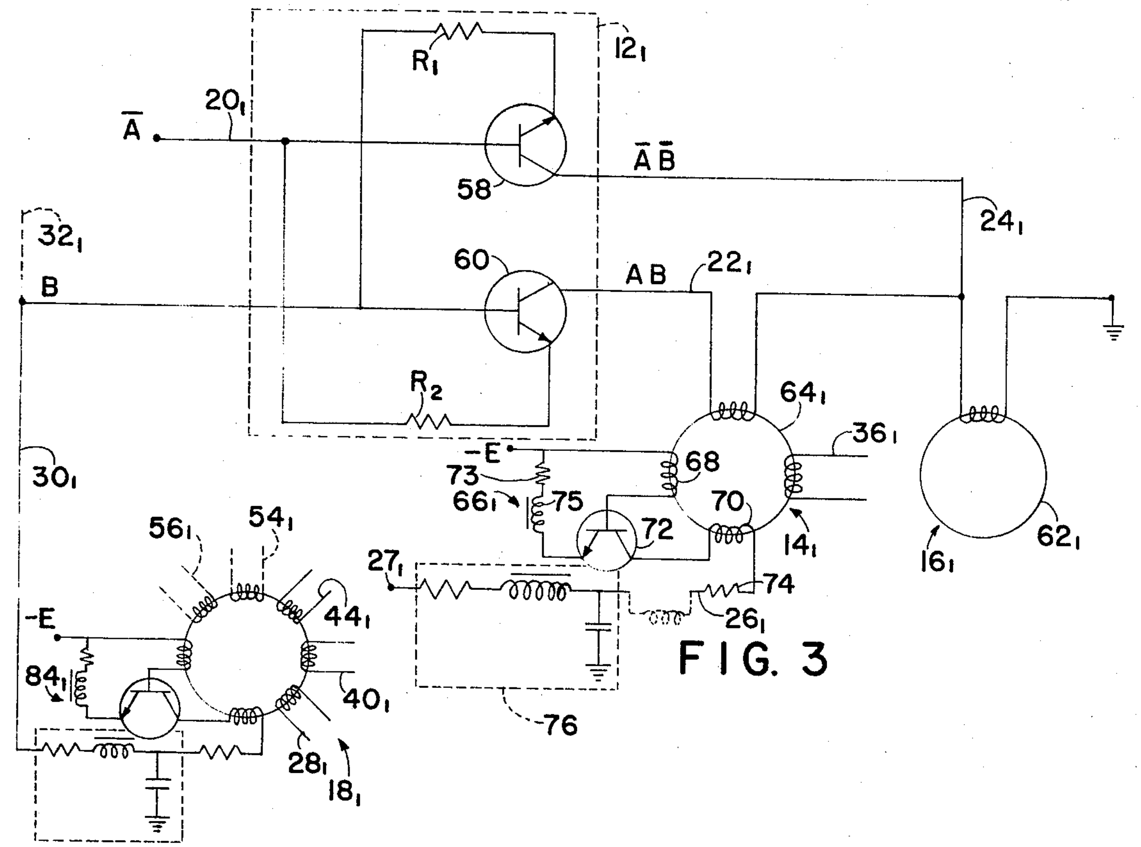
FIG. 3 is a schematic diagram of one form of suitable circuitry at a particular stage in the computer.
Figure 4:
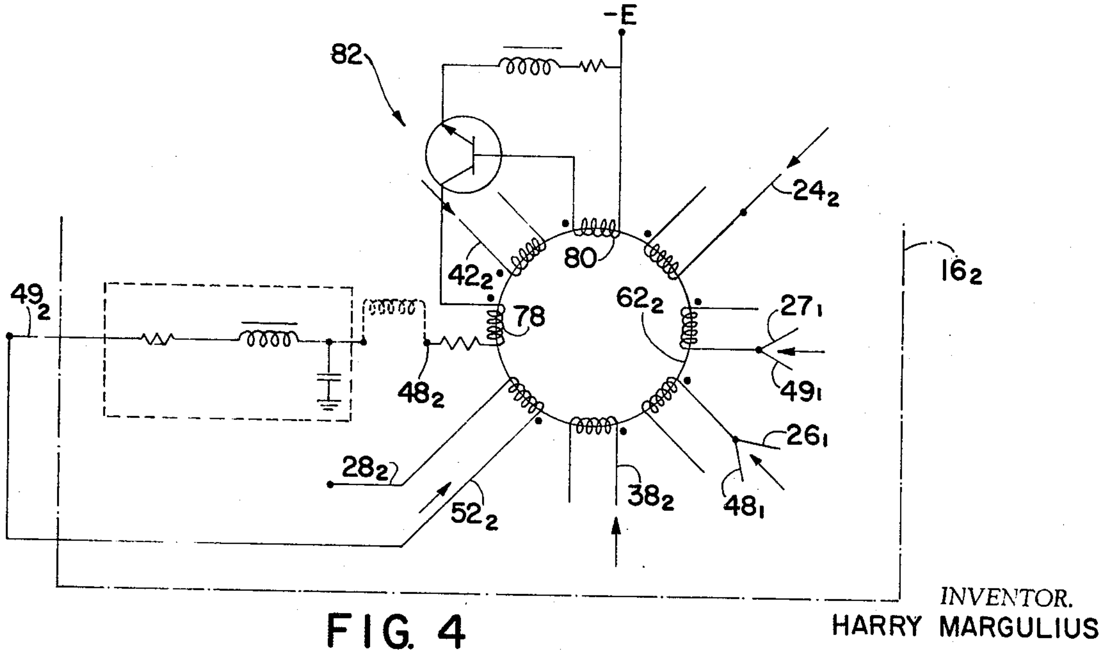
FIG. 4 is a schematic showing of a preferred embodiment of an element representing one digit order of the counter or accumulator.

In the illustrated embodiment, the arithmetic unit includes an additional register, termed the buffer-transfer register and indicated in FIG. 1 by the block numbered 18. Register 18 receives from accumulator 16 and stores the final result of the arithmetic operation, which may be shifted out of register 18 as an input to half adder 12 or to memory 10. Alternative designs within the scope of the present invention would allow register 18 to be eliminated as a separate stage of the unit by incorporating certain of its functions into other stages. This will be pointed out in somewhat more detail when the circuit diagrams of FIGS. 3 and 4, showing more clearly the nature and operation of register 18 and other portions of the unit, are considered.

Referring now to the general interconnection between the various stages shown in FIG. 1, memory 10 is connected to half adder 12 by line 20. Lines 22 and 24 carry information from half adder 12 to storage register 14 and accumulator 16, respectively. The latter two stages are connected by line 26, and the accumulator is connected to buffer-transfer register 18 by line 28. The output of register 18 is carried by line 30 back to half adder 12 and may optionally be fed back to memory 10, as indicated by dotted line 32. In addition to the aforementioned lines which carry information from one stage of the unit to another, the clock pulse generator applies, in a predetermined, timed sequence explained later, clock or shift pulses to memory 10, register 14, accumulator 16 and register 18 through lines 34, 36, 38 and 40, respectively. Also, control pulses are supplied from the block numbered 41, which may comprise any suitable, previously known signal generator, to accumulator 16 and register 18 through lines 42 and 44, respectively, and optionally to memory 10 as indicated by dotted line 46.

Half adder 12, in the illustrated embodiment, comprises a plurality of suitable gate circuits, whereby the input signals are combined and the output signals are supplied to register 14 and accumulator 16 without the necessity of pulsing the half adder. For example, assume one word or number is stored in register 10 and another in register 18 and that an operation is to be performed on these numbers. The clock pulse generator (CPG) supplies pulses to both register 10 and register 18 which shift out the numbers stored therein, feeding them as simultaneous inputs to half adder 12. These inputs are gated to produce one output representing, e.g., the carrys generated in the addition of the two numbers, this output being applied to register 14, and a second output representing, e.g., the partial sum which may be applied to accumulator 16 and stored therein, the latter having been cleared of any information previously stored therein. Hence, a single pulse results in the partial addition of two numbers, with the partial sum stored at one stage in the computer and the carrys at another.

Figure 2:
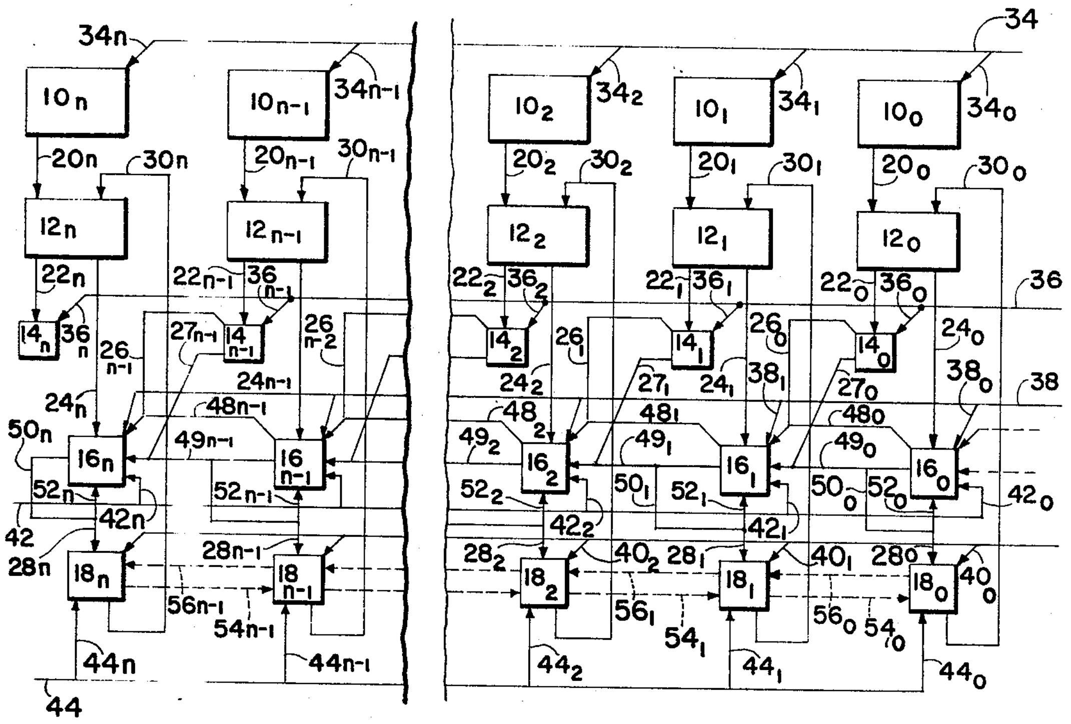
FIG. 2 is a more detailed block diagram showing the individual elements at each stage and the general manner of their interconnection.

Referring now to FIG. 2, the arithmetic unit is shown in somewhat more detail, again in block form, to include the individual elements corresponding to each digit order and their manner of interconnection within, as well as between, the various stages. The unit is adapted to handle numbers of up to $n$ digits, as indicated by the subscripts $0$–$n$. Memory unit $\mathbf{10}_0$ is connected by line $\mathbf{20}_0$ to half adder unit $\mathbf{12}_0$ so that a signal representative of the least significant digit of one of the numbers to be operated on may be supplied from memory 10 to half adder 12. The least significant digit of the other number is supplied as an electrical signal through line $\mathbf{30}_0$ from buffer-transfer register element $\mathbf{18}_0$, where such number has previously been stored, as explained later in more detail.

Half adder element $\mathbf{12}_0$ comprises a conventional gate circuit, as illustrated and described in connection with FIG. 3, adapted to provide one output signal through line $\mathbf{22}_0$ to carry storage element $\mathbf{14}_0$, and a second output through line $\mathbf{24}_0$ to accumulator element $\mathbf{16}_0$. The two digits supplied through lines $\mathbf{20}_0$ and $\mathbf{30}_0$ are combined through the logic function of the gate circuit; separate signals indicating the sum and carry resulting from the addition of the two digits are applied to and retained by the accumulator and carry storage elements, respectively, in the corresponding digit order.

Each of the individual elements of register 14, accumulator 16 and register 18 include identical output systems adapted to feed the information out of these elements through two separate lines, the information through one line being spaced in time, although identical in content, to that through the other of the two lines. That is, assuming the information to be in the form of a current flow through the output lines, as in the illustrated embodiment, each of the said elements is adapted to put out an "undelayed" (with respect to the application of a clock or shift pulse to the element) and a "delayed" current. Exactly how this is accomplished will become apparent from the following description of FIGS. 3 and 4. To remain with the present consideration of FIG. 2, however, the lines numbered $\mathbf{26}_0$ and $\mathbf{27}_0$ represent the undelayed and delayed outputs, respectively, from carry storage element $\mathbf{14}_0$. These lines are seen to be connected to lines $\mathbf{48}_0$ and $\mathbf{49}_0$, respectively, which represent the undelayed and delayed outputs of accumulator element $\mathbf{16}_0$. The combined lines $\mathbf{26}_0$ and $\mathbf{48}_0$ serve as one input to accumulator element $\mathbf{16}_1$, and the combined lines $\mathbf{27}_0$ and $\mathbf{49}_0$ serve as a second input thereto. Also connected to line $\mathbf{49}_0$ is line $\mathbf{50}_0$ which carries the delayed output of accumulator element $\mathbf{16}_0$ to buffer-transfer register element $\mathbf{18}_0$ through line $\mathbf{28}_0$ and back to accumulator element $\mathbf{16}_0$, as an inhibit feedback, through line $\mathbf{52}_0$. Line $\mathbf{30}_0$ carries the output of register element $\mathbf{18}_0$ to half adder element $\mathbf{12}_0$, as shown in FIG. 1. The output of register 18 may be either delayed or non-delayed, as explained hereinafter, as required for synchronizing the input B from register with the input $\overline{A}$ from memory 10 to half adder 12. Also shown in FIG. 2 are clock pulse lines 34, 36, 38 and 40 and control pulse lines 42 and 44 leading to the appropriate individual elements, as mentioned in connection with FIG. 1 with respect to the various stages of the arithmetic unit. Dotted lines $\mathbf{54}_0$–$\mathbf{54}_{n-1}$ and $\mathbf{56}_0$–$\mathbf{56}_{n-1}$ denote optionally useable interconnections between successive elements of register 18 for shifting a number stored therein to the left or to the right, as also explained later in more detail. The diagram of FIG. 2 shows fully, in block form, all of the individual elements and interconnections thereof necessary to form one embodiment of the invention. Although many of the elements and connecting lines have been mentioned only with respect to the zero digit order of the arithmetic unit, these are seen to be repeated identically at each succeeding digit order.

In FIG. 3 is shown in some detail the circuitry of a suitable embodiment of the individual elements of half adder 12, and the manner of supplying the outputs thereto to the corresponding individual elements of register 14 and accumulator 16, which are shown as comprising magnetic core elements. The illustrated circuit represents half adder element $\mathbf{12}_1$ and associated circuitry of the "one" digit order. The half adder element receives two simultaneous inputs, in the form of electrical currents, one through each of lines $\mathbf{20}_1$ and $\mathbf{30}_1$ which are connected to the bases of transistors 58 and 60 respectively. The emitter of each transistor is connected, through suitable resistors $R_1$ and $R_2$, to the input line to the base of the opposite transistor. The collector of transistor 58 is connected by line $\mathbf{24}_1$ to a winding on magnetic core $\mathbf{62}_1$ of accumulator element $\mathbf{16}_1$, while the collector of transistor 60 is connected by line $\mathbf{22}_1$ to a winding on magnetic core $\mathbf{64}_1$ of the carry storage element $\mathbf{14}_1$ and further connected to line $\mathbf{24}_1$ and therefore to the aforementioned winding on the accumulator core $\mathbf{62}_1$. The winding of the accumulator core, and hence both output lines $\mathbf{22}_1$ and $\mathbf{24}_1$ from the half adder element, is connected to ground.

In the circuit configuration of FIG. 3, an input to the base of either transistor 58, 60 wil lturn that transistor on, unless there is also an input to the emitter which prevents this. From the illustrated connections of the collector terminals to the core windings, it may be seen that an output from transistor 60 will register in both cores while an output from transistor 58 will register only in the core of an accumulator element $\mathbf{16}_1$. In order to perform addition of two binary digits with this circuit, one of the digits is inverted (i.e., the opposite of the digit's actual value is used) before being applied as an input to its respective transistor. The reason for this is simplification of the circuitry, as explained in the following paragraphs.

If two binary numbers A and B are to be added, the sum will equal one when either A or B, but not both, equal one; otherwise, the sum will equal zero. The carry equals one only when both A and B equal one. This is conventionally expressed as follows:

$$S=A\overline{B}+\overline{A}B$$
$$C=AB$$
$$\overline{S}=AB+\overline{A}\overline{B}$$

From this it may be seen that the term AB (i.e., A and B both equal one) is common to both the carry (C) and the inverted sum ($\overline{S}$). The sum of two binary digits will always be inverted if one of the digits is inverted before being added to the other. Therefore, instead of adding A and B, one of the digits, e.g., A, is inverted and the reverse of its actual value is added to B, thereby producing an inverted sum. The inverted sum will equal one when the input $\overline{A}$ equals zero ($A=1$) and the input B equals one, and when the input $\overline{A}$ equals one and the input B equals zero ($\overline{B}=1$), as shown in the preceding expression. The carry will equal one when the input $\overline{A}$ equals zero ($A=1$) and the input B equals one. Hence, both the inverted sum and the carry will equal one when $\overline{A}=0$ ($A=1$) and $B=1$.

Applying the above to the circuit of FIG. 3, an input on line $\mathbf{20}_1$ ($\overline{A}=1$) with no input on line $\mathbf{30}_1$ ($B=0$, $\overline{B}=1$) will produce an ontput from transistor 58, which may be characterized as $\overline{AB}$ (the two values which are equal to one). This output will be recorded in accumulator core $\mathbf{62}_1$ to indicate that the inverted sum at this digit order is equal to one (the accumulator element, however, may have the capability, as pointed out later, to invert the inverted sum and record the actual sum as zero). An input on line $\mathbf{30}_1$ ($B=1$) with no input on line $\mathbf{20}_1$ ($\overline{A}=0$, $A=1$) will produce an output from transistor 60, which may be characterized as AB (again, the two values which are equal to one). This one output will be registered in both the core of carry storage element $14_1$ and the core of accumulator element $16_1$, indicating that both the inverted sum and carry are equal to one. Thus, it may be seen that the logic functions $\overline{AB}$ and AB are performed by the circuit of FIG. 3, with the carry stored in one location in the computer and the inverted sum, which may be again inverted to reflect the actual sum, in another.

The gate circuit described above is a conventional circuit, usually termed an exclusive "OR," from the logic function which it performs. The carry and inverted sum are both generated with this circuit since the function AB is common to both, as previously pointed out. If the actual sum, rather than the inverted sum, were to be generated by the half adder an exclusive "OR" would still be satisfactory to perform the required function $A\overline{B}+\overline{A}B$. However, it will be noted that this term does not include the carry function AB. An additional gate circuit ("AND") would therefore be required to generate the carry function, which accounts for the previous statement that the circuitry may be simplified by using an inverted sum, easily accomplished by inverting one of the input representing the digits to be added.

Of course, the functions explained above pertain to only one digit order of the numbers to be added by the arithmetic unit. Hence, the sum of the digits A and B would more properly be termed one digit in the partial sum of two numbers including the digits A and B at a corresponding digit order. For purposes of the present discussion it is assumed that the operation of half adder 12 is the same at each bit position, or digit order, as that explained above for the single unit. At this point in the description, however, it should be clear how two numbers of up to *n* digits each may be applied simultaneously to the unit and result in the partial sum being stored in the accumulator and the carrys generated in the addition of the pair of digits at each digit order being stored in a separate register, which may thus be termed the carry storage register.

In order to arrive at the final sum, each carry generated in the above-described addition process must be added to the digit of the partial sum in the next digit order forward. Furthermore, if a carry is generated from the addition of a carry and a digit of the partial sum, this carry must also be added to the next digit of the partial sum, and so on. According to previous practice, the carry generated at the least significant, i.e., the zero, digit order, if any, is added to the partial sum digit in the next digit order forward and, if a new carry is generated from this addition, it is propagated or rippled through all succeeding digit orders until a digit order is reached where no carry is produced from the addition of the carry and a partial sum digit. Subsequent to the "settling out" of the first carry, the carry from the "one" digit order is added to the partial sum digit in the "two" digit order, and rippled through the remaining higher digit orders, and so on, until all carrys have been added to the partial sum and settled out. In a synchronous computer, sufficient time must be allowed between the successive clock pulses by which carrys are applied to allow for the longest possible case, i.e., that where a carry is propagated all the way to the most significant digit order. This process is accelerated somewhat in an asynchronous computer by applying the next carry as soon as each one settles out. Other arrangements have also been devised for speeding up the process even further (see, e.g., U.S. Pat. No. 3,098,153, of H. J. Heijn, issued July 16, 1963). The present invention, however, proposes a novel arrangement of computer elements which allows all carrys to be applied simultaneously to all digits of the partial sum, whereby the longest time possible in reaching the final sum is that time required for only *one* carry rather than one for each digit order to propagate, through the accumulator holding the partial sum, from the least to the most significant digit order.

The schematic diagram of the circuitry associated with carry storage element $14_1$ in FIG. 3 represents the complete circuitry required to construct a suitable embodiment corresponding to one digit order of register 14. Before proceeding to a detailed description of the circuitry (FIGS. 3 and 4) associated with the carry storage register 14, and the accumulator 16, the general function of the magnetic bistable units of the carry storage 14, accumulator 16, and register 18 will be reviewed. Magnetic logic elements of this type have been widely used in equipment produced by DI/AN Controls and others.

Each element $14_0$ . . . $14_n$, $16_0$ . . . $16_n$, $18_0$ . . . $18_n$ is a two-state device, and at any given time (except during switching) it is resting in either of these two states which can be labeled as either the "0" state or the "1" state. These states are physically manifested in the device by the direction of magnetization of the core, either clockwise or counterclockwise. Thus, when there are no pulses applied to the elements $14_0$, . . . $18_n$, each is simply a storage element which stores one bit of information in its associated magnetic core. In the absence of pulses, the output system associated with each core is not active.

Two types of pulses are applied to these devices, one is identified as a "shift" pulse and appears, for example, on line $36_1$ associated with element $14_1$. The second is identified as a "logic" or "input" pulse, and appears, for example on line $22_1$. They are also identified in this specification as the nondelayed and delayed output pulses respectively when generated by the logic elements. A shift pulse drives a core in such a manner that if it is storing a "1" when the pulse is applied, the core is "cleared" or "reset" to the zero state, and two pulses are produced by the output network associated with the element, which are the nondelayed and delayed output pulses previously referred to. The nondelayed output occurs almost simultaneously with the shift pulse which triggered it, and is identical in shape. It can, then be used as a shift pulse when applied to other similar elements. The delayed output, however, is spaced in time from the shift pulse and it is also altered in shape. These two effects are caused by the output network associated with each element. It may be applied as a "logic" pulse to other similar elements. If an element is in the "0" state and a logic pulse is applied to an input winding in a positive manner (that is, current applied with respect to the winding sense as indicated by a dot such that the magnetization direction for a "one" is produced) then the core is "set" to the "1" state. In this way logic pulses may be employed to transfer the information from an element that is shifted or cleared to a second element. To clear the second element before attempting to load information into it, the shift pulse emanating from the first element in advance of the logic pulse may be employed. If the shift pulse is applied to an element which already has a "0" stored in it, there is no resulting output on either the nondelayed or delayed output lines.

As can be seen in FIGS. 3 and 4, several logic input windings may be provided to perform various logic functions within an element. Thus when a first logic winding receives a logic pulse in a positive manner, and a second logic input pulse is applied, but in negative manner, (oppositely connected relative to the dot on the winding), then the net effect on the core will be zero applied magnetization. The state of the core does not change. The second input may be referred to as an "inhibit" input. Designating these two logic inputs X and Y respectively, the element is seen to accomplish the logic function $X\overline{Y}$. If there were no "inhibit" i.e. if $Y=0$, then the core would have been set ($X\overline{Y}=1$).

Ordinarily, then, there are two phases in time associated with every operation of a magnetic core logic element of this type. First, the logic is implemented on the core as a result of a combination of positive inputs and inhibit inputs. The core in the element is then sitting in a given state, either "1" or "0." Then, secondly, a shift pulse clears the core and generates two outputs out of the element only if the core is in the "1" state; and these outputs are a nondelayed current pulse which may be used as a shift pulse, and a delayed logic pulse. In addition to the input winding supplied by line $22_1$, element $14_1$ includes a clock or shift winding supplied by line $36_1$ from the clock pulse generator as shown in FIGS. 1 and 2, and an output system denoted generally by the reference numeral $66_1$. This output system includes two "sense" windings 68 and 70 on core $64_1$, transistor 72, resistors 73 and 74, choke 75 and RCL delay unit 76. A voltage induced across windings 68 and 70 by the changing flux of core $64_1$ will turn on transistor 72 to produce a short current pulse on line $26_1$ which will subsequently turn transistor 72 off. It will be noted, however, that delay unit 76 is interposed in the output system before the current appears on line $27_1$, whereby the output of this line occurs after the output on line $26_1$. Thus, the output on line $26_1$ may be used as a clock or shift pulse to accumulator element $16_2$ while the output on line $27_1$ is used as logic pulse to the same element. The output system comprising the two windings, transistor, choke, resistors and delay unit is a conventional magnetic core output system commercially available in many applications from DI/AN Controls, Inc., Boston, Mass., and much descriptive literature thereon has also been published. It is therefore to be understood that the output system shown and described in connection with various elements of the present apparatus forms no part, in itself, of the present invention. Element $18_1$ of buffer-transfer register 18 is shown in FIG. 3 as supplying the input B to half adder element $12_1$ on line $30_1$ the structure and operation of element $18_1$ will be described in more detail after a consideration of FIG. 4.

Referring now to FIG. 4, there is shown in more detail a preferred embodiment of a complete, single unit of units identical to that shown in FIG. 2, or equivalent elements capable of performing the same logic and memory functions at each digit order, may be used to form the accumulator. In the described embodiment, the accumulator is assumed to be made up of *n* individual units, one for each digit order and all identical to the complete, individual unit shown in FIG. 4. The illustrated unit will be assumed to represent the "two" digit order and is accordingly denoted generally by the reference numeral $16_2$. Each accumulator unit includes a magnetic core, four input or inhibit windings, two shift (also commonly termed clock or reset) windings, and an output system identical to that just described in connection with carry storage element $14_1$. The magnetic circuit may comprise, for example, a square loop magnetic toroid capable of being magnetized, and retaining the magnetic field, in either of two directions. The several windings on this toroid, and the small amount of associated circuitry schematically shown, permit the magnetic state of the core, as determined by the direction of current flow and polarity of the various windings, to be transferred as a "bit" of information to other elements within or apart from the accumulator. In accordance with normal schematic circuit convention, the direction of current flow through each winding is indicated by an arrow, and the polarity, or direction of winding about the core, is shown by a dot, those windings having the dots on the same side being of like polarity.

The magnetic core of accumulator unit $16_2$ is indicated by the reference numeral $62_2$ and the output system, including output windings 78 and 80, the transistor, choke and delay network, by the numeral $82_2$. So that the windings may be more easily identified and related to the other figures (particularly FIG. 2), they are indicated by the reference numerals of the lines by which they are connected to other elements of the arithmetic unit, with the exception of output windings 78 and 80. The input or inhibit windings are identified by the lines numbered $24_2$, $42_2$, $52_2$ and $27_1$–$49_1$. Line $24_2$ is connected to half adder element $12_2$ so that the function $AB+\overline{AB}$ will register in core $62_2$, as explained previously in connection with FIG. 3. Line $49_1$ connects one of the windings of accumulator unit $16_2$ to the delayed output of accumulator element $16_1$ and line $27_1$ connects the same winding to delayed output line $27_1$ of carry storage element $14_1$, so that an output from either of the aforementioned elements will be received as an input to core $62_2$. Another of the windings is connected by line $42_2$ to signal generating means 41 which supplies a unity input needed to invert the input from the half adder; i.e., the half adder input is the inverted partial sum, as previously explained, which becomes the actual partial sum when inverted by the unity input on line $42_2$. Line $52_2$ supplies a feedback input (inhibit) back to one of the windings of accumulator element $16_2$ from the delayed output thereof. The inhibit feedback on line $52_2$ from the delayed output of accumulator element $16_2$ cooperates with the connections on lines $48_1$ and $49_1$ from element $16_1$ or in the alternative, cooperates with the connections $26_1$ and $27_1$ from the carry storage element $14_1$ to effect a "toggle" connection to the accumulator element $16_2$. The result of a toggle input to a bistable device is to change its state from "zero" to "one" or from "1" to "0." A sequence of bistable elements with toggle connections from each element to the next higher order element constitutes a binary counter, of which many implementations are known in the art.

The operation of element $16_2$ is as follows: Assuming the core initially cleared, as noted above, the half adder $12_2$ actually generates the inverse partial sum, namely $\overline{S}$, and that this information is transmitted to accumulator element $16_2$ on line $24_2$, at the same time as a control pulse is applied to the same element on line $42_2$. It will be noted that the input $24_2$ is connected to an "inhibit" winding, while the control pulse connection is of the opposite polarity. The result is, that the element $16_2$ receives a "one" only if there is no output from the half-adder. Thus it is S which enters $16_2$. Assuming, then, that element $16_2$ has received a "0," and at the same clock pulse element $16_1$ of the next lower order received a zero, then there may, or may not, be a "1" in the carry storage element $14_1$. On the next clock pulse applied to all of the elements of the register 14, if $14_1$ contains a zero (no carry), nothing happens. But if element $14_1$ does contain a carry, then a nondelayed shift pulse and a delayed logic pulse are transmitted from it to the element $16_2$. On arrival of the shift pulse on line $26_1$, nothing happens; but on arrival of the delayed logic pulse on line $27_1$, the element $16_2$ is set to "1." On the other hand, if prior to transfer of carries, the element $16_2$ had received a partial sum of "1," then the shift pulse from $14_1$ would shift the core from that "1" to "0" immediately, and at the same time generate an output pulse in line $48_2$, which, in turn, after the time delay, is fed back as an inhibit on line $52_2$. The inhibit pulse arrives just as the delayed logic pulse arrives from core $14_1$ and cancels it out, thereby leaving the element $16_2$ in its new "0" state. The final possibility is that the partial sum in element $16_1$ is a "1," then it is a logical necessity that there can be no carry in element $14_1$; but there may, or may not, be a carry in element $14_0$. In this case, application of the clock pulses to the carry storage elements cannot result in a pulse from element $14_1$, but may result in a pulse from $14_0$ which immediately switches element $16_1$ in the above described manner except that the shift pulse is applied on line $26_0$. Switching of element $16_1$ in turn results in a nondelayed shift pulse and a delayed logic pulse on lines $48_1$ and $49_1$ respectively which are applied to toggle element $16_2$ in the same way as do pulses from the carry storage element $14_1$.

As an example with five-bit numbers, and the worst-case carry situation, assume that $A=11111$ and $B=00001$ with the least significant bit appearing on the right-hand side. It is evident that the partial sum is $S$=11110 and that the carry register 14 is loaded with the number 00001, a carry is generated only from the least significant-bit position. It is also evident that the final sum is 100000 (five zeros) with a one spilled over into the sixth bit position). To arrive at this, a second clock pulse is applied on line 36 simultaneously to all of the shift inputs of the elements $14_0$ . . . $14_n$ of the carry storage register 14. Only one of the carry storage elements, the zero order element $14_0$, will produce an output, a nondelayed shift output and a delayed logic output. When this pair of outputs are applied to the first-order accumulator unit $16_1$, its "1" state is switched to "0" due to the binary counter action described above, and it produces two outputs, a nondelayed shift output to the next accumulator unit $16_2$, and a delayed logic output to the same element. In like fashion the next two accumulator elements $16_3$, $16_4$ are switched to the zero state, and the fifth element $16_5$, for the sixth bit, is switched to the "1" state because when the partial sums were loaded, it received no partial sum, remaining in the zero state. A carry is thus rippled through the whole accumulator in an amount of time equivalent to five times the transistor switching speed of the semiconductor amplifier 82 that is a part of every core transistor logical element. The switching speed is typically on the order of less than 100 nanoseconds.

As a second example, add the number 01111 to the number 00101. After half addition, the partial sum in accumulator 16 is $S$=01010, and the carry register contains $C$=00101. As before, the least significant bit appears at the right. A common shift pulse applied to every element of register 14 causes element $14_0$ of digit order zero and element $14_2$ of order 2 to shift out a pair of nondelayed and delayed pulses to the first and third order elements $16_1$ and $16_3$ respectively of the accumulator 16. This accumulator may now be conceived as being made up of two counters one of which starts with element $16_1$ and ends with element $16_2$, and a second counter which starts with element $16_3$ and ends with element $16_4$ of digit order four. When these two counters receive their inputs from the carry storage elements, $14_0$ and $14_2$ respectively, the result is that each shifts the "1" present in its first position exactly one position to the left. The accumulator now assumes the value 10100, which is precisely the final sum. Since carries propagate simultaneously in these two effective counters, the total time required for carry propagation is much less than that required in the worst-case example.

The shift windings on core $62_2$ are identified by the lines numbered $38_2$ and $26_1$–$48_1$. As previously described, the clock pulse generator shown in FIG. 1 is connected to a winding on each of the accumulator cores, this connection being effected by line $38_2$ in the case of accumulator element $16_2$. The other shift winding on core $62_2$ is connected by lines $26_1$ and $48_1$ to receive as a shift input either the undelayed output of accumulator element $16_1$ or that of carry storage element $14_1$. Combining lines $26_1$ and $48_1$, as well as lines $27_1$ and $49_1$ to form single input lines is sufficient for this purpose since it is mathematically impossible to have simultaneous outputs from carry storage element $14_1$ (a carry from the addition of the two digits in the "one" digit order) and from accumulator element $16_1$ (a carry from the addition of the partial sum in the "one" digit order with a carry from the "zero" digit order).

Input line $52_2$, supplying the inhibit feedback from delayed output line $49_2$, is numbered $28_2$ on the other side of the winding. Line $28_2$ supplies an input to buffer-transfer register element $18_2$. Line $28_1$, leading from accumulator element $16_1$, is shown in FIG. 3 as supplying an input to one of the windings on the core of register element $18_1$. This element also includes windings receiving inputs through lines $40_1$ and $44_1$, from the clock pulse and control pulse generators, respectively. Optionally useable windings from lines $54_1$ and $56_1$ may be used for the purpose of transferring laterally to and from the next adjacent elements on the right and left the information stored in register 18. Output system $84_1$ is identical to the previously described systems $66_1$ and $82_2$ to carry storage element $14_1$ and accumulator element $16_2$. Output line $30_1$ may receive the current after the latter has passed through a delay network if required to synchronize input B to the half adder with input $\overline{A}$ from memory.

The manner of operation of the arithmetic element in performing addition operations should now be clear from the foregoing detailed description. Memory 10 and register 18 are clocked simultaneously, or in such timed sequence that the inputs $\overline{A}$ and B are applied simultaneously to half adder 12. This results in the carrys of the addition of A and B being stored in register 14 and the partial sum in accumulator 16. A unity input to each element of accumulator 16 through lines $42_0$ . . . $42_n$ is implemented simultaneously with the input of the partial sum so that the latter will be inverted. The second clock pulse is then applied through line 36 to the elements of register 14, thereby shifting out the carries as two outputs, spaced in time from one another. The first, or nondelayed output, serves as a clock or shift pulse to the accumulator elements in the next digit order forward, as does a similar, non-delayed output from the accumulator elements themselves. The non-delayed outputs from each element of the carry storage register are combined with the non-delayed outputs from the element representing the corresponding digit order in the accumulator to form a single shift input to the accumulator element representing the next highest digit order. The delayed outputs of the carry storage and accumulator elements are connected in like manner to form a single logic input to the accumulator element representing the next highest digit order. When a logic "one" is stored in any element of the accumulator, as a portion of the partial sum, an input of an additional logic "one" from either the carry storage or accumulator element in the preceding digit order will change this to a "zero" and shift out a "one" to be applied as an input to the next accumulator element; if such element already holds a "one," this in turn will be changed to a "zero" with a "one" shifted out for application to the next accumulator element, and so on until an accumulator element is reached where no additional "one" is generated. In this manner the carrys are applied simultaneously to the partial sum and any additional carrys generated in the addition of a carry and a partial sum digit are propagated through the accumulator to reflect the final sum when all carries have settled out. It will be noted that no additional clock pulses are applied in arriving at the final sum after the single clock pulse applied to carry storage register 14.

Subtraction may be performed with the disclosed apparatus merely by using non-inverted inputs to the half adder, i.e., by using A and B rather than $\overline{A}$ and B, and by providing feedback from the most to the least significant digit order in the accumulator for the "end around carry." After the final sum is held in the accumulator, a clock pulse applied to the elements thereof will shift the sum to the buffer-transfer register. The shifts right and left necessary to perform multiplication and division may be accomplished within this register by the use of aforementioned, optionally useable windings 54 and 56 with an extra control pulse. Also, control pulses would be used in the illustrated embodiment to prevent an input to register 18, through line 28, until such input reflects the final sum shifted out of the accumulator.

It should be noted that other elements capable of performing the same functions could be substituted for certain of the elements as illustrated. For example, half adder 12 could easily be constructed from magnetic cores, if desired, but are shown as a transistor gate circuit since the half adder requires no memory capability in the illustrated embodiment. The use of magnetic cores is preferred as the storage-logic elements of the accumulator due to the aforementioned advantages of such elements and the fact that arithmetic operations are performed by the unit of the invention without the objectionable time loss assoicated with magnetic cores in previously known computer apparatus.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A parallel entry, binary full adder comprising in combination:

(a) an augend register comprising a plurality $n$ of bistable storage elements each corresponding to a digit order of a number, and each element having an input connection through which it is enabled to be set to a "1" state, and each element having an output connection from which a signal may be extracted indicative of the state of said element, where $n$ is any integer greater than two, (b) an addend register comprising $n$ memory cells, each of said cells having an output connection and having a clock-pulse connection, said register constituting means for delivering at said output connections responsive to a first clock pulse, signals representing successive corresponding bits of an addend stored in said register, (c) a half adder comprising $n$ gate elements, each having a first input connected to the corresponding ordered one of said augend register outputs, and a second input connected to the corresponding ordered one of said addend register output connections, each said gate element having a partial-sum output circuit connected to indicate the partial sum of addition of quantities applied to said two half-adder element inputs, and a carry output circuit connected to indicate the carry, if any, associated with said sum, (d) an accumulator comprising $n$ bistable counter units each unit having input means connected to said corresponding order half-adder partial-sum output, said input means effecting storage of a state indicative of said partial sum in said unit, each said unit except the $n$th unit comprising means for applying a toggle input to trigger the next higher order said unit, each said unit except the first, comprising means for accepting said toggle input from the next lower order of said units, (e) a clock pulse generator, and (f) a carry storage register comprising $n$ bistable carry storage elements, each said carry storage element being connected to the correspnoding one of said half-adder gate elements to receive the carry output and to assume a state representative thereof, each of said elements being connected to said clock pulse generator and comprising means responsive to a second clock pulse for applying triggering signals to said accepting means of said next higher order accumulator units from said carry storage elements having carries, (g) said clock pulse generator comprising means for generating said first clock pulse, means for applying said first pulse to said augend register, and to said addend register to extract from said registers corresponding bits into said half adder gate elements thereby to set corresponding partial sum bits into corresponding accumulator elements and to enter the corresponding carries into corresponding ones of said carry storage elements, and means for generating a second clock pulse after said first clock pulse to trigger the release from said carry storage elements, for the bit orders having carries, signals to initiate the toggling of said higher order accumulator units.

2. A parallel entry, binary full adder comprising in combination:

(a) an accumulator comprising $n$ bistable counter units each unit having input means adapted to effect storage of a state indicative of one of the $n$ partial sums of half addition of an $n$-bit addend and an $n$-bit auguend in said unit, each said unit except the $n$th unit comprising triggering means for applying a toggle input to trigger the next higher order said unit, each said unit except the first, comprising means for accepting said toggle input from the next lower order of said units, (b) a clock pulse generator, (c) a carry storage register comprising $n$ bistable carry storage elements, each said carry storage element being adapted to effect storage of a state representative of the carry, if any for its order resulting from said half addition, each of said elements being connected to said clock pulse generator and comprising triggering means responsive to a second clock pulse for applying triggering signals to said accepting means of said next higher order accumulator units from said carry storage elements having carries, and (d) half-adder means for accepting $n$ signal pairs each pair comprising a signal representative of a bit of said augend and a signal representative of a corresponding bit of said addend, and means for yielding therefrom signals effective with said input means to set said accumulator with states representative of said partial sums, and signals effective with said carry storage elements to set into said carry storage register the states representing carries, if any, (e) $n$ being any integer greater than two, and (f) said clock pulse generator comprising means for generating said first clock pulse, means for applying said first pulse to effect said half addition, thereby to set corresponding partial sum bits into corresponding accumulator elements and to enter the corresponding carries into corresponding ones of said carry storage elements, and means for generating a second clock pulse after said first clock pulse to trigger the release from said carry storage elements, for the bit orders having carries, signals to initiate the toggling of said higher order accumulator units.

3. The invention according to claim 2 wherein said units and carry storage elements comprise magnetic cores with input windings and output circuitry.

4. The invention according to claim 3 wherein said triggering means includes means for supplying two outputs spaced in time, from each of said units and carry storage elements.

5. The invention according to claim 4 wherein the pair of said two outputs from each of said carry storage elements and the pair of said outputs from each of said units of a particular order are applied as pairs of inputs, spaced in time, to said counter unit representing the next higher bit order.

6. The invention according to claim 5 wherein the first one of each of said pairs of inputs to be applied to said counter units acts as a shift input, and the second acts as a logic input.

7. The invention according to claim 4 wherein said carry storage elements each comprise a magnetic core, an amplifier, a logic input winding, a clock pulse input winding, an output winding connected to said amplifier, a feedback winding connected to said amplifier, and a pulse delay network.

8. The invention according to claim 5 wherein said accumulator units each comprise a magnetic core, a second amplifier, a second logic input winding, a second shift pulse input winding, an inversing inhibit winding, a second output winding connected to said second amplifier, a second feedback winding connected to said amplifier, a second pulse-delay network, and a second inhibit winding connected to said second pulse-delay network.

9. The invention according to claim 8 wherein said triggering means comprise said output windings and said pulse delay network, and said accepting means comprise said second shift input winding, said second logic input winding, and said second inhibit winding, said second shift winding being connected to said next-lower-order output windings, and to said next lower order delay network to pass current from said output winding into said delay network, and wherein said second logic winding is connected to receive delayed pulses from said next lower order delay network.

References Cited

UNITED STATES PATENTS

| | | | |
|---|---|---|---|
| 3,197,623 | 7/1965 | Yii | 235—173 |
| 3,192,368 | 6/1965 | Franck et al. | 235—175 |
| 3,042,304 | 7/1962 | Hall et al. | 235—153 |

OTHER REFERENCES

Mao-Chao Chen: A Magnetic Core Parallel Adder, IRE Transactions on Electronic Computers, December 1958, pp. 262–4.

EUGENE G. BOTZ, Primary Examiner

D. H. MALZAHN, Assistant Examiner

U.S. Cl. X.R.

235—173